United States Patent
Wang

(10) Patent No.: US 9,465,048 B1
(45) Date of Patent: Oct. 11, 2016

(54) PROBE UNIT FOR TEST TOOLS AND METHOD OF MANUFACTURING THE SAME

(71) Applicant: INOTERA MEMORIES, INC., Taoyuan (TW)

(72) Inventor: Wei-Chih Wang, New Taipei (TW)

(73) Assignee: INOTERA MEMORIES, INC., Taoyuan (TW)

( * ) Notice: Subject to any disclaimer, the term of this patent is extended or adjusted under 35 U.S.C. 154(b) by 0 days.

(21) Appl. No.: 14/667,676

(22) Filed: Mar. 24, 2015

(51) Int. Cl.
| | |
|---|---|
| *G01Q 70/16* | (2010.01) |
| *G01Q 70/14* | (2010.01) |
| *B22C 9/22* | (2006.01) |
| *B22D 19/00* | (2006.01) |
| *B22D 21/02* | (2006.01) |
| *B22D 25/02* | (2006.01) |
| *B23K 31/02* | (2006.01) |
| *G01Q 70/08* | (2010.01) |

(52) U.S. Cl.
CPC ............... *G01Q 70/16* (2013.01); *B22C 9/22* (2013.01); *B22D 19/00* (2013.01); *B22D 21/022* (2013.01); *B22D 25/02* (2013.01); *B23K 26/21* (2015.10); *B23K 31/02* (2013.01); *G01Q 70/08* (2013.01); *G01Q 70/14* (2013.01)

(58) Field of Classification Search
CPC ...... G01Q 70/16; G01Q 70/14; G01Q 70/08; B82Y 40/00; B23K 26/21; B23K 31/02; B22C 9/22; B22D 21/022; B22D 25/02
See application file for complete search history.

(56) References Cited

U.S. PATENT DOCUMENTS

| | | | | |
|---|---|---|---|---|
| 5,866,021 | A * | 2/1999 | Yagi ................... | B81C 1/00111 216/84 |
| 6,756,584 | B2 * | 6/2004 | Hantschel ............. | B82Y 35/00 216/11 |
| 2006/0016986 | A1 * | 1/2006 | Wen ....................... | B82Y 35/00 250/306 |
| 2012/0279287 | A1 * | 11/2012 | Andry ..................... | G01B 5/28 73/105 |
| 2014/0237690 | A1 * | 8/2014 | Neu ........................ | G01Q 70/16 850/9 |
| 2015/0309073 | A1 * | 10/2015 | Mirkin ................... | B82Y 40/00 850/55 |

* cited by examiner

*Primary Examiner* — Wyatt Stoffa
(74) *Attorney, Agent, or Firm* — Winston Hsu; Scott Margo

(57) ABSTRACT

The present invention provides a novel method of manufacturing the probe unit and a tip assemble and disassemble procedure for test tools, which includes a body with a joint portion and a base portion and a probe tip extending from one side of the base portion opposite to the joint portion, where the probe tip and the base portion are integrally made of same material different from the material of the joint portion.

7 Claims, 6 Drawing Sheets

PROBE UNIT FOR TEST TOOLS AND METHOD OF MANUFACTURING THE SAME

BACKGROUND OF THE INVENTION

1. Field of the Invention

The present invention generally relates to a probe unit for test tools and method of manufacturing the same, and more particularly, to a probe unit with low cost and simple tip replacement and method of manufacturing the same.

2. Description of the Prior Art

Scanning probe microscopes (SPMs) providing very high resolution images of various surface properties are typically employed as a means of measuring surface topography and corresponding electrical property analysis. Different types of electrical properties can be measured, such as conductivity, voltage, capacitance, resistivity, current, and others. Accordingly, many different SPM techniques may be used when measuring electrical properties. For example, SPM techniques that may be used for synchronously providing electrical signals corresponding to topographic images comprise scanning capacitance microscopy (SCM), scanning spreading resistance microscopy (SSRM), Kelvin force microscopy (KFM) and conductive atomic force microscopy (C-AFM).

The scanning capacitance microscope (SCM) apparatus works by scanning a tiny tip over the surface of a sample being imaged, while synchronously measuring the electrical properties of the sample. A typical SCM apparatus comprises an atomic force microscope (AFM) and an ultra-high frequency (UHF) resonant capacitance sensor can synchronously provide a two-dimensional image. The AFM acquires surface topographic images, and the UHF resonant capacitance sensor provides a synchronous two dimensional differential capacitance images. The AFM typically comprises a cantilever and a conductive probe at the free end of the cantilever. In most AFMs the position of the cantilever is detected with optical techniques. A red laser beam (670 nm) reflected off the back of the cantilever onto a position-sensitive photo-detector is adapted to detect the position of the cantilever. The AFM can thus generate topographic images.

However, photo/laser perturbations, such as the photovoltaic effect and the high-level carrier injection effect induced by stray light of the AFM red laser beam lead to distorted differential capacitance (dC/dV) profiles and hence perturb the contrast of SCM images. The photo/laser perturbations induced by the AFM laser beam not only affect the image contrast of SCM images, but also reduce the accuracy of the determination of the carrier concentration distribution.

In addition, the conventional AFM tool may not meet the requirement for testing the product in advanced technology node due to its large probe tip contact area and tilted contact angle. The tool's throughput and probe tip cost are also affected by complicated tip replacement mechanism and high adapter cost. Accordingly, solutions to these problems have been long sought but thus far have eluded those skilled in the art.

SUMMARY OF THE INVENTION

This invention will describe a novel method of manufacturing a probe unit (also referred as a tip adapter) for test tools. The method features the simple, low cost steps to manufacture the probe tip and tip adapter on a wafer by semiconductor process. A high uniformity of tip electrical property and well control of tip shape can be achieved for advance technology node required high scanning resolution purpose and better signal/noise ratio (S/N) performance since the whole manufacturing method can be well conducted by current mature semiconductor process. In addition, the novel design of tip adapter can extend the capability of conventional AFP (atomic force prober) test tools for advanced technology node due to its finest and well controlled tip shape and quick tip replacement mechanism.

One objective of the present invention is to provide a probe unit for test tools which includes a body with a joint portion and a base portion and a probe tip extending from one side of the base portion opposite to the joint portion, wherein the probe tip and the base portion are integrally made of same material different from the material of the joint portion.

Another objective of the present invention is to provide a method of manufacturing probe units for test tools, which includes the steps of providing a substrate, forming a plurality of recesses with the shape of desired probe tip in the substrate, depositing a first material layer on the substrate and filling up the recesses to form a probe tip in each recess, depositing a second material layer on the first material layer, and patterning the first material layer and the second material layer into a plurality of probe units, wherein the second material layer forms a joint portion of the probe unit for jointing a test tool, and each probe unit includes one probe tip.

In one aspect, the method of the present invention further includes the step of assembling the probe unit with a test tool by welding or vacuum absorption method.

In an alternative aspect, the method of the present invention further includes the step of disassembling the probe unit from the test tool by melting or gas purging method.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

DETAILED DESCRIPTION

Figure 1:
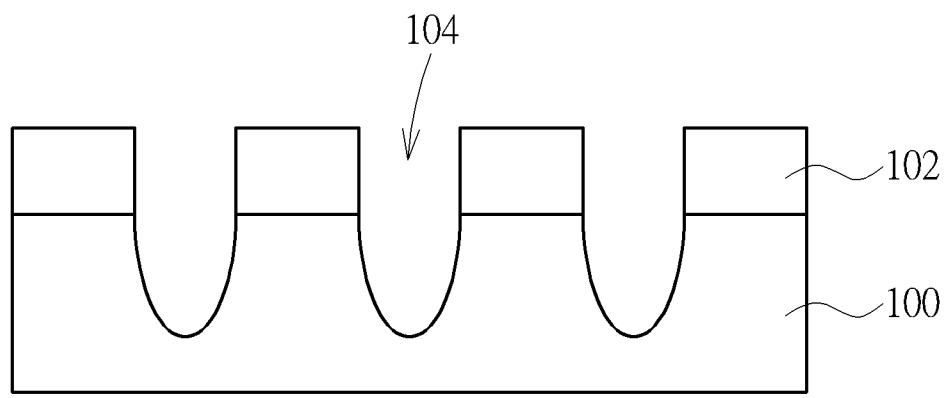
FIGS. 1-3 are cross-sectional views depicting an exemplary process flow of manufacturing probe units (tip and tip adaptor) for test tools in accordance with the embodiment of the present invention.

In the following detailed description of the present invention, reference is made to the accompanying drawings which form a part hereof and is shown by way of illustration and specific embodiments in which the invention may be practiced. These embodiments are described in sufficient details to enable those skilled in the art to practice the invention. Other embodiments may be utilized and structural, logical, and electrical changes may be made without departing from the scope of the present invention. The following detailed description, therefore, is not to be taken in a limiting sense, and the scope of the present invention is defined by the appended claims.

Before describing the preferred embodiment in more detail, further explanation shall be given regarding certain terms that may be used throughout the descriptions.

The term "etch" or "etching" is used herein to generally describe a fabrication process of patterning a material, such that at least a portion of the material remains after the etch is completed. For example, it should be understood that the process of etching silicon involves the steps of patterning a masking layer (e.g., photoresist or a hard mask) above the silicon, and then removing the areas of silicon no longer protected by the masking layer. As such, the areas of silicon protected by the mask would remain behind after the etch process is complete. However, in another example, etching may also refer to a process that does not use a mask, but still leaves behind at least a portion of the material after the etch process is complete. The above description serves to distinguish the term "etching" from "removing." When etching a material, at least a portion of the material remains behind after the process is completed. In contrast, when removing a material, substantially all of the material is removed in the process. However, in some embodiments, 'removing' is considered to be a broad term that may incorporate etching.

The terms "forming," "form," "deposit," or "dispose" are used herein to describe the act of applying a layer of material to the substrate. Such terms are meant to describe any possible layer-forming technique including, but not limited to, thermal growth, sputtering, evaporation, chemical vapor deposition, epitaxial growth, electroplating, etc. According to various embodiments, for instance, deposition may be performed according to any appropriate well-known method. For instance, deposition can comprise any process that grows, coats, or transfers material onto a substrate. Some well-known technologies include physical vapor deposition (PVD), chemical vapor deposition (CVD), electrochemical deposition (ECD), molecular beam epitaxy (MBE), atomic layer deposition (ALD), high density plasma CVD (HDPCVD) and plasma-enhanced CVD (PECVD), amongst others.

The "substrate" as used throughout the descriptions is most commonly thought to be silicon. However, the substrate may also be any of a wide array of semiconductor materials such as germanium, gallium arsenide, indium phosphide, etc. In other embodiments, the substrate may be electrically non-conductive such as a glass or sapphire wafer.

Figure 2:
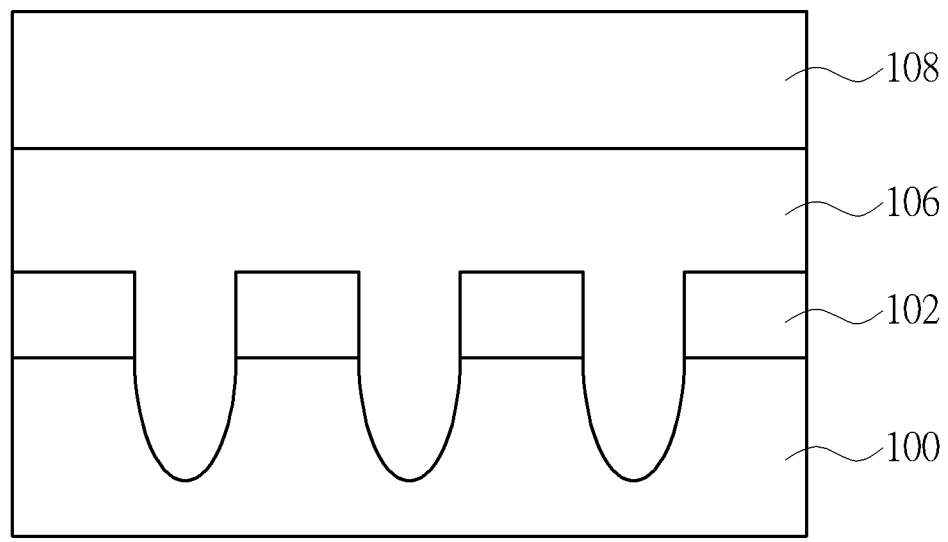
Figure 3:
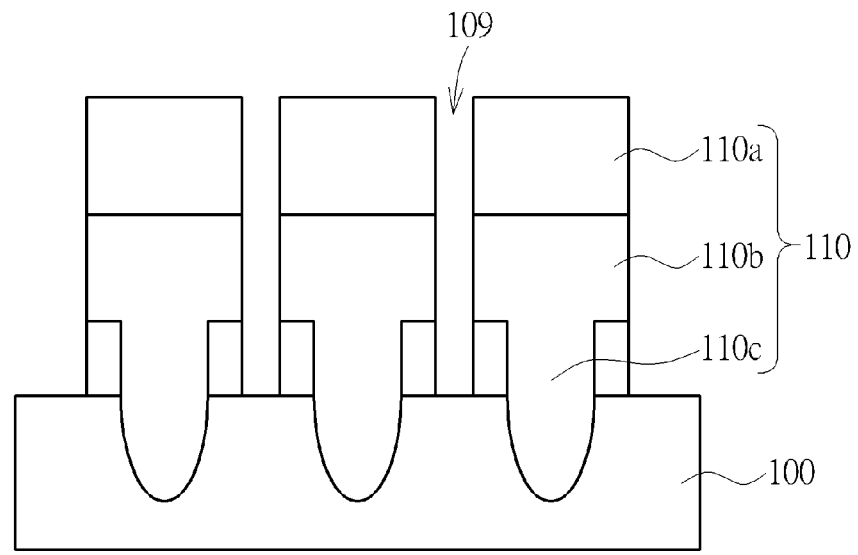

FIGS. 1-3 are cross-sectional views depicting an exemplary process flow of manufacturing probe units (tip and tip adaptor) for test tools in accordance with the embodiment of the present invention. The present invention is directed to provide a novel method of manufacturing probe units for test tools. The probe unit in the present invention may also be referred as a tip adaptor, which is designed to be assembled replaceably on a probe arm of the test tool with different spec for different devices under test (DUT). Hundreds of thousands of the probe units may be easily manufactured on a 12" wafer at a time by applying currently available semiconductor process.

First, please refer to FIG. 1. A semiconductor substrate 100, such as 12" silicon wafer, is provided to serve as a base for forming the probe unit of the present invention. A thermal oxidation procedure is performed at a temperature between about 750 to 850° C. in an oxygenic ambient, resulting in the growth of an oxide layer 102, ex. silicon dioxide ($SiO_2$), on the substrate 100. The oxide layer 102 will serve as an insulation and spacer between probe units and the substrate 100. A photolithographic process and an etching process are performed to form a plurality of cylindrical recesses 104 on the substrate 100. The recess 104 may be arranged in an array with the shape of desired probe tip of different specs and aspect ratios, for example, a probe tip end with a diameter of 20 nanometer (nm) and a length of 100 nm.

Please refer to FIG. 2. After forming the recesses 104 in the substrate 100, a first material layer 106 is deposited on the substrate 100. The first material layer 106 would fill up the recesses 104 and cover the whole substrate 100. The portion of the first material layer 106 filling in the recess forms the probe tip of the probe unit. In the present invention, the first material layer 106 may be made of materials with suitable strength, conductivity and flexibility for atomic force probing (AFP), such as tungsten (W). After depositing the first material layer 106, a second material layer 108 is deposited on the first material layer 106. The second material layer 106 may be made of alloys with good metallic weldability, such as titanium/titanium nitride (Ti/TiN). In the present invention, the second material layer 106 will serve as a portion of the probe unit for jointing a probe arm.

Please refer to FIG. 3. After forming the first material layer 106 and the second material layer 108 on the substrate 100, another photolithographic process and etching process are performed to pattern the first material layer 106 and the second material layer 108 into a plurality of probe units 110. The probe units are separated apart by the spacings 109 formed in the patterning process and may be well arranged in an array on the substrate 100. Each probe unit 110 includes an upper joint portion 110a formed of patterned second material layer 106, a middle base portion 100b formed of patterned first material layer 106, and a lower probe tip 110c extending from one side of the base portion 100b opposite to the joint portion 110a. The probe tip 110c is formed of the portion of the first material layer 106 filling in the recess. It should be noted that the probe tip 110c and the base portion 110b are integrally made of same material (i.e. the first material such as W) different from the material of the joint portion 110a (i.e. the second material such as Ti/TiN). The joint portion 110a is preferably made of the alloy with good metallic weldability, so that it may be easily assembled on the test tools.

Figure 4:
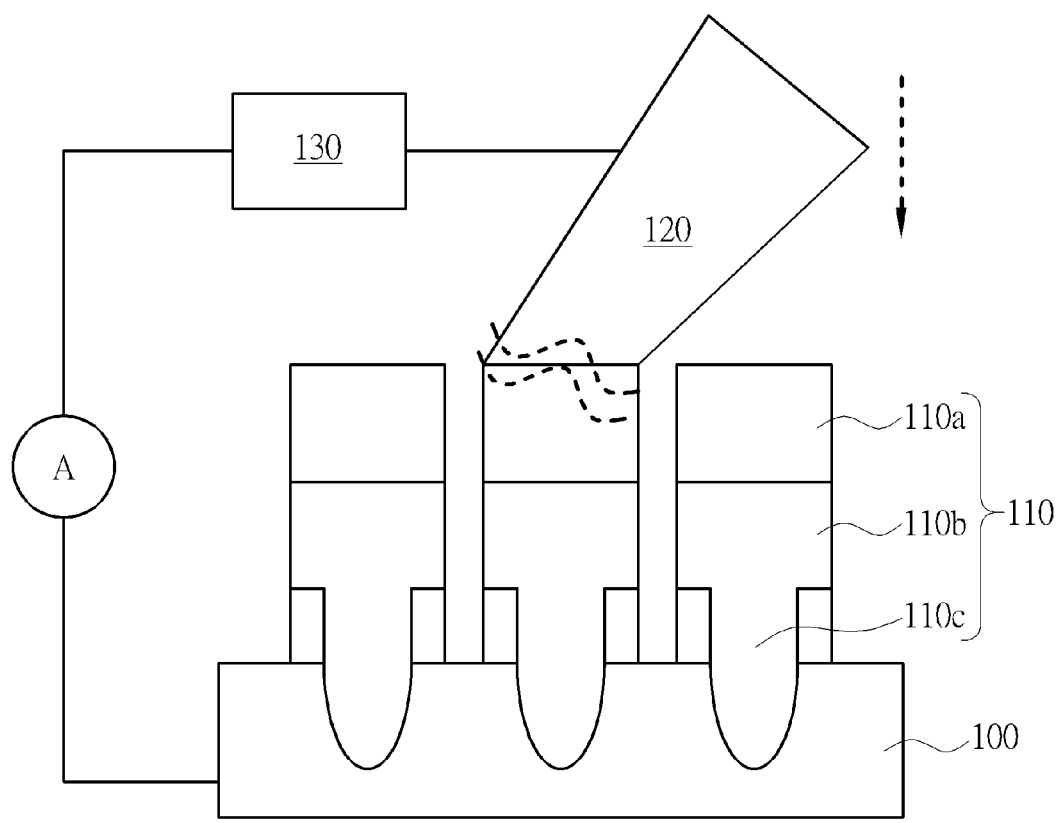
FIGS. 4-5 are cross-sectional views depicting an exemplary process flow of assembling the probe unit and probe arm in accordance with the embodiment of the present invention.

In addition to the above-mentioned simple processes for manufacturing the probe units 100, the present invention also features a fast, simple tip assemble/exchange method which means it does not need to perform conventional laser re-adjustment step in every tip replacement step, which can significantly improve the throughput of current conventional AFP (SPM) tool. Please refer to FIGS. 4-5, which are the cross-sectional views of assembling the probe unit 100 on a probe arm 120 of the test tools in accordance with the embodiment of the present invention. First, in FIG. 4, pressing a probe arm 120 of a test tool on the joint portion 110a of one predetermined probe unit 110 is performed. A heating process, such as a pulse laser heating or a high pulse voltage heating, is then performed by a heating device 130 connecting with the probe arm 120 and the substrate 100 to melt the joint portion 110a with lower melting point and good weldability. The melted joint portion 110a and pressed probe arm 120 would be welded together. It can be noted from the figure that the jointing process is activated once the probe arm 120 contact the joint portion 110a to turn on the heating circuit, so that conventional precise laser re-adjustment is unnecessary in the assembly process of the tip adaptor.

Figure 5:
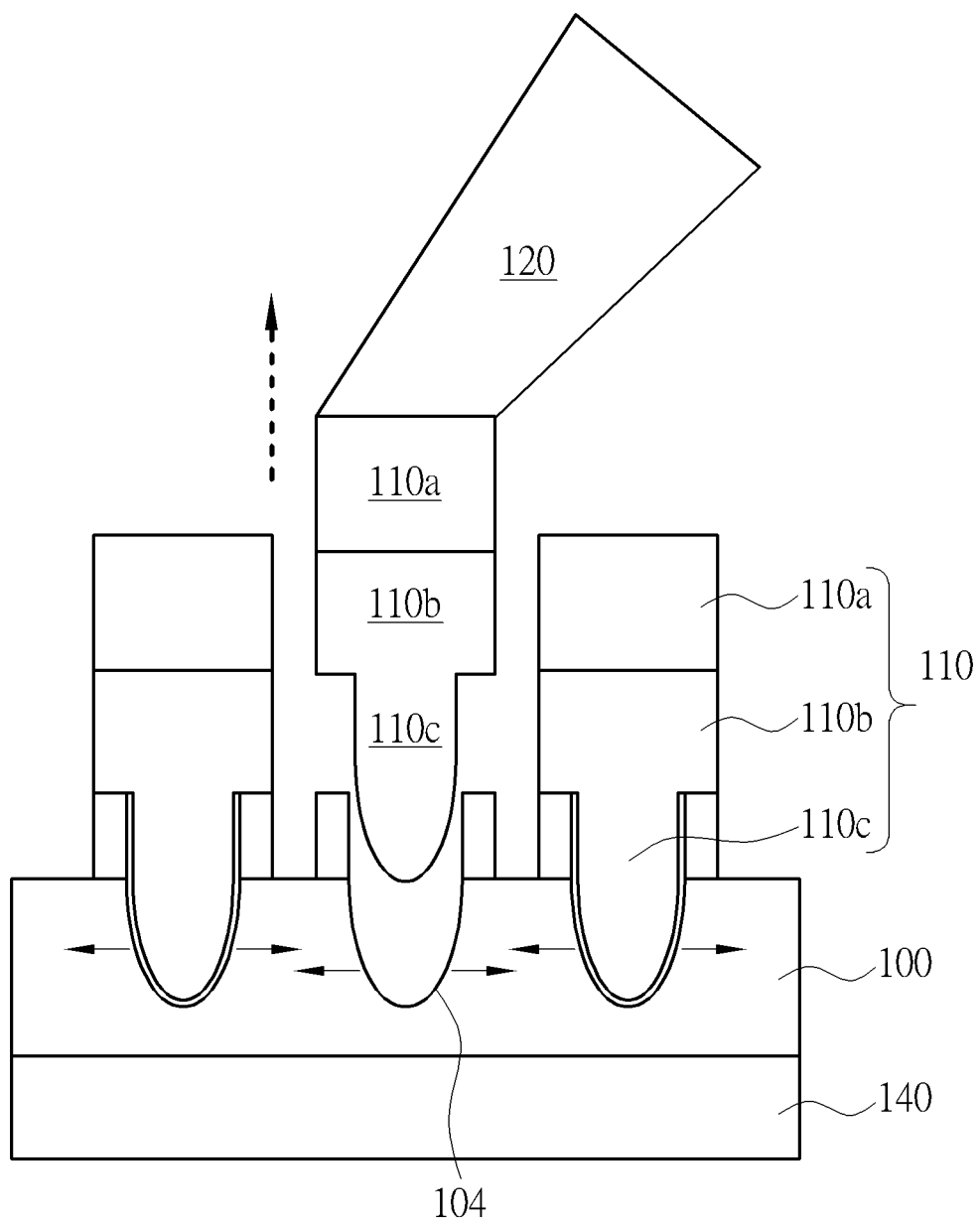

Please refer to FIG. 5. After the probe arm 120 and the probe unit 110 are jointed, the substrate 100 would have a temperature change process caused by a unit 140 (ex. a heating plate) to expand the recess 104 formed thereon. Please note that, in the present invention, since the material of the probe tip 110c and the base portion 110b (i.e. the first material) are selected from the material having different coefficient of thermal expansion from the substrate 100, the recess 104 would be expanded large enough to release the probe tip 110c from the substrate 100. After the temperature change process, the jointed probe unit 110 may be pulled out from the recess 104 with the probe arm 120.

Figure 6:
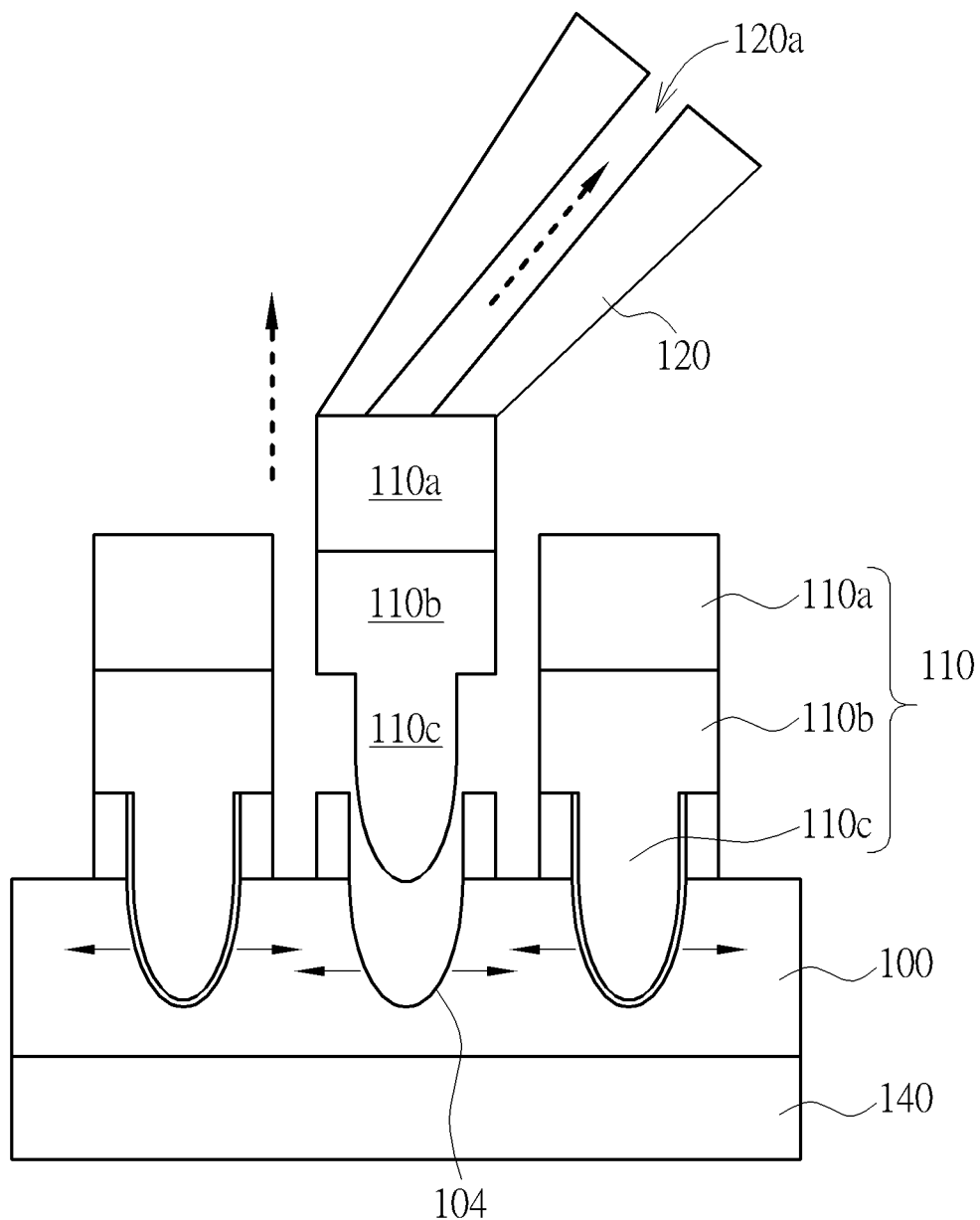
FIG. 6 is a cross-sectional view depicting a process flow of assembling the probe unit and probe arm in accordance with another embodiment of the present invention.

The present invention also provides an alternative assembly method for the probe unit 100 by vacuum absorption. Please refer to FIG. 6. In this embodiment, the probe arm is provided with an air channel 120a to exert vacuum environment, the probe unit 110 in contact would be absorbed on the outlet of the air channel 120a of the probe arm 120, so that the probe unit 110 is jointed on the probe arm 120. The same substrate temperature change and pulling out step are also performed as those performed in previous embodiment after the joint to separate and move the probe unit 110 from the substrate 100.

Figure 7:
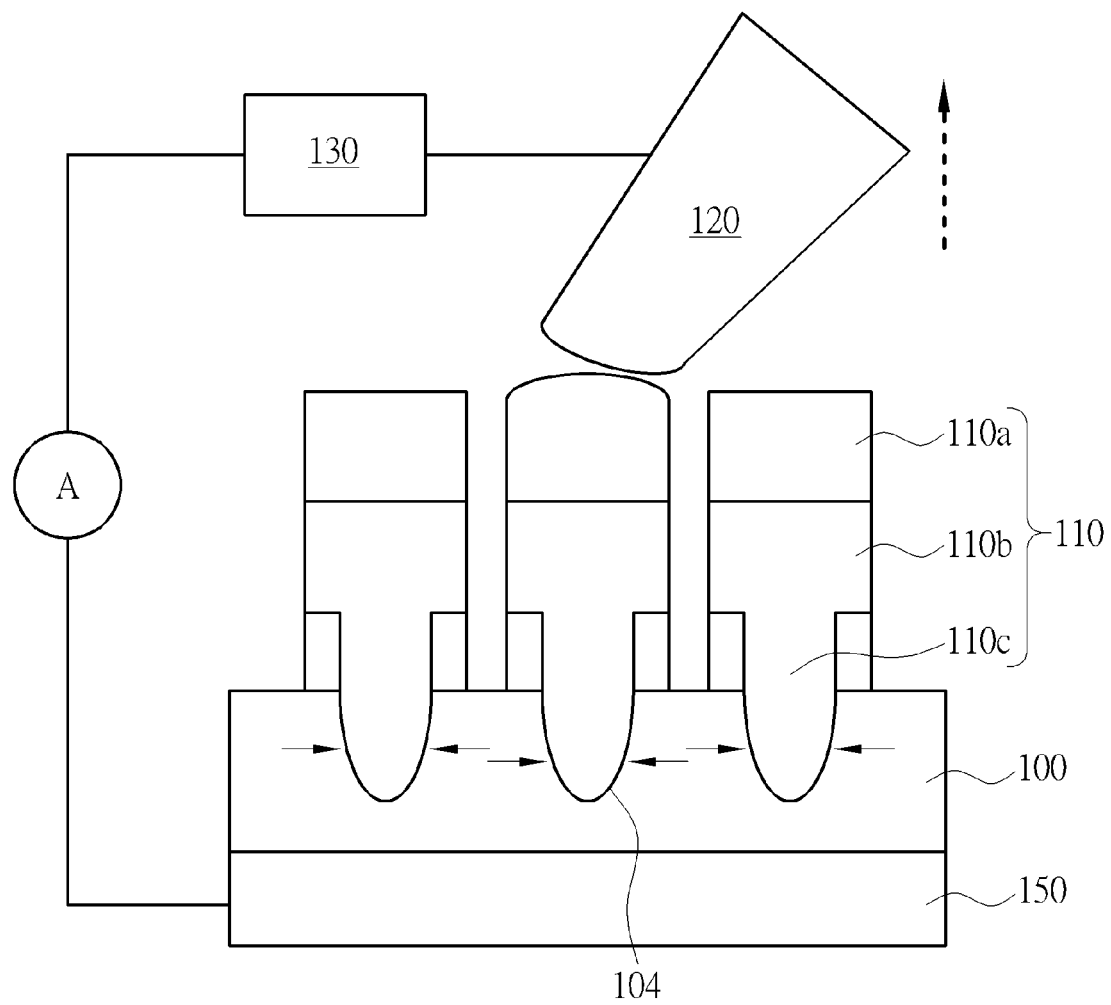
FIG. 7 is a cross-sectional view depicting an exemplary process flow of disassembling the probe unit and probe arm in accordance with the embodiment of the present invention.

In addition to the above-mentioned assembly process of the probe units 110 and the probe arm 120, the present invention also provide a disassembly method for the probe units 110 and the probe arm 120. Please refer to FIG. 7. The disassembly process of the present invention may have reverse procedure of the above assembly process. First, place the probe tip 110c into one recess 104. The substrate 100 is then conduct the temperature change by a unit 150 to contract the recess 104 formed thereon. Please note that, in the present invention, since the material of the probe tip 110c and the base portion 110b (i.e. the first material) are selected from the material with different coefficient of thermal expansion from the substrate 100, the recess 104 would be contracted enough to clamp the probe tip 110c in the substrate 100. After the heating process, the jointed joint portion 110a would be melted again by the heating device 130, so that the probe arm can be easily removed from the joint portion 110a of the probe unit 110 in the condition that the probe unit 110 is clamped on the substrate. In the embodiment that the probe unit 110 is assembled on the probe arm 120 by vacuum absorption (FIG. 6), the probe unit 110 can be even more easily disassembled by just purging gas from the probe arm 120 to release the vacuum seal.

Figure 8:
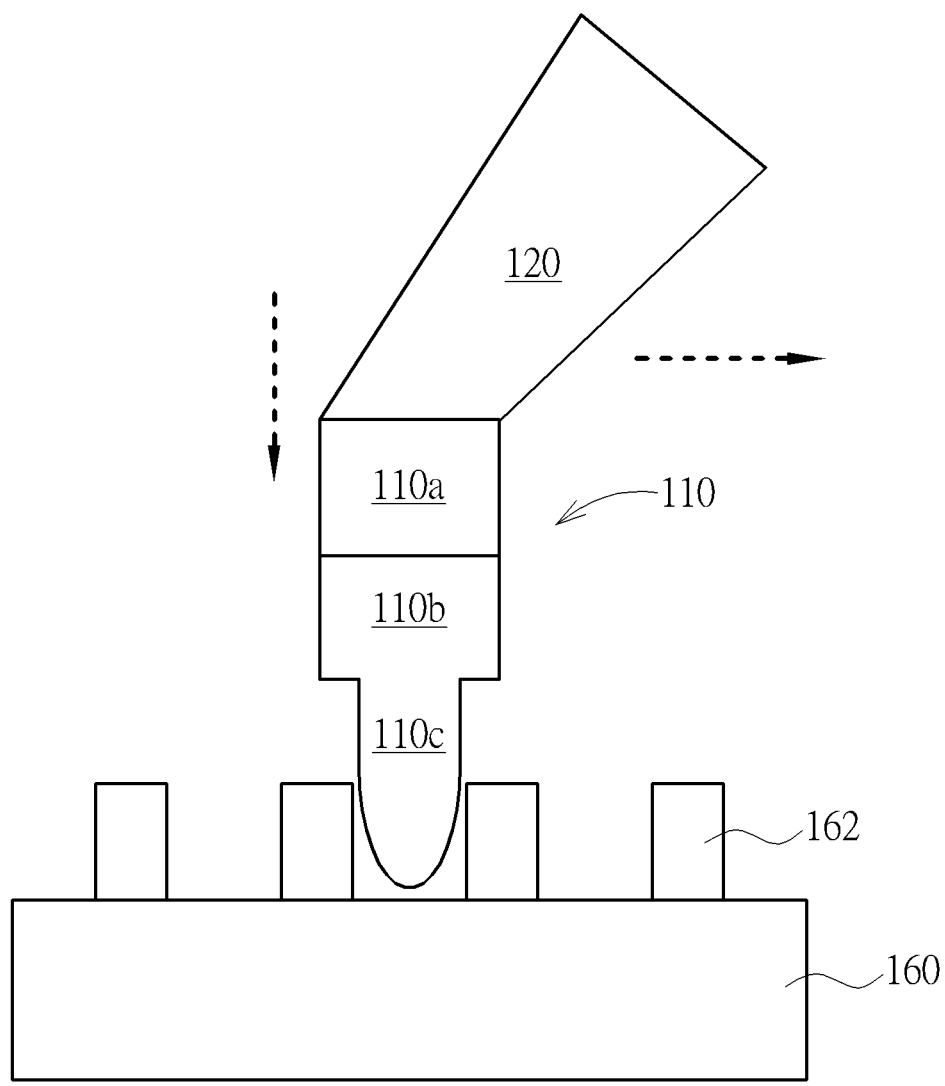
FIG. 8 is a cross-sectional view depicting the testing/scanning process flow of a sample by using the probe unit accordance with the embodiment of the present invention; and It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

Please refer to FIG. 8, which is a cross-sectional view depicting the testing/scanning step of a sample by using the probe unit 110 in accordance with the embodiment of the present invention. In the present invention, since the joint portion 110a and the base portion 100b are formed in the same patterning process, the diameter of the base portion 100b is equal to the diameter of the joint portion 110, for example, is preferably larger than 50 nm. Moreover, the end diameter of the probe tip 110c is preferably smaller than 50 nm and the length of the probe tip is preferably larger than 100 nm, so that a good probe tip shape with an aspect ratio larger than 2 can be provided to scan the sample 160. The probe tip with small diameter and high aspect ratio in vertical orientation may easily conform to the topography of device or circuit patterns 162 formed on sample 160 in advanced technology node, to obtain a better image resolution and low noise SCM (scanning capacitance microscopy) data result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of manufacturing probe units for test tools, comprising:
   providing a substrate;
   forming a plurality of recesses with the shape of desired probe tip in said substrate;
   depositing a first material layer on said substrate and filling up said recesses to form a probe tip in each said recess;
   depositing a second material layer on said first material layer; and
   patterning said first material layer and said second material layer into a plurality of probe units, wherein said second material layer forms a joint portion of said probe unit for jointing a test tool, and each said probe unit comprises one said probe tip;
   pressing a probe arm on said joint portion of one said probe unit;
   assembling said probe arm and said joint portion of said probe unit;
   changing the temperature of said substrate to expand said recesses and release said probe tip from said substrate; and
   pulling out said probe unit with said probe arm.

2. The method of manufacturing probe units for test tools of claim 1, wherein the coefficient of thermal expansion of said substrate is different from the coefficient of thermal expansion of said first material layer.

3. The method of manufacturing probe units for test tools of claim 1, wherein said probe arm and said joint portion of said probe unit are assembled by melting and welding.

4. The method of manufacturing probe units for test tools of claim 3, wherein said probe arm and said joint portion are melted and welded by pulse laser heating or high voltage heating.

5. The method of manufacturing probe units for test tools of claim 3, further comprising the disassembly steps of:
   placing said probe tip into said recess;
   changing the temperature of said substrate to contract said recesses and clamp said probe tip;
   melting and debonding said probe arm and said probe tip; and
   removing said probe arm from said clamped probe tip.

6. The method of manufacturing probe units for test tools of claim 1, wherein said probe arm and said joint portion of said probe unit are assembled by vacuum absorption.

7. The method of manufacturing probe units for test tools of claim 6, further comprising the disassembly steps of gas purging said probe arm to release said probe unit.

* * * * *